(12) United States Patent
Benyon et al.

(10) Patent No.: US 11,043,987 B2
(45) Date of Patent: Jun. 22, 2021

(54) ESTIMATING THE ELECTRICAL LINE LENGTH OF A DIGITAL SUBSCRIBER LINE

(71) Applicant: BRITISH TELECOMMUNICATIONS PUBLIC LIMITED COMPANY, London (GB)

(72) Inventors: Paul Benyon, London (GB); David Rohlfing, London (GB); Ian Horsley, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 260 days.

(21) Appl. No.: 16/088,218

(22) PCT Filed: Mar. 13, 2017

(86) PCT No.: PCT/EP2017/055851
§ 371 (c)(1),
(2) Date: Sep. 25, 2018

(87) PCT Pub. No.: WO2017/167570
PCT Pub. Date: Oct. 5, 2017

(65) Prior Publication Data
US 2020/0412409 A1    Dec. 31, 2020

(30) Foreign Application Priority Data
Mar. 30, 2016 (EP) .................................... 16162972

(51) Int. Cl.
*H04B 3/46* (2015.01)
*H04B 3/54* (2006.01)

(52) U.S. Cl.
CPC .............. *H04B 3/46* (2013.01); *H04B 3/542* (2013.01); *H04B 3/546* (2013.01)

(58) Field of Classification Search
CPC ...................................................... H04B 3/46
See application file for complete search history.

(56) References Cited

U.S. PATENT DOCUMENTS

| 7,885,633 B2 * | 2/2011 | Schwager | H04B 17/309 455/402 |
| 2004/0148139 A1 * | 7/2004 | Nguyen | G05B 23/0221 702/189 |

(Continued)

OTHER PUBLICATIONS

International Search Report for PCT/EP2017/055851, dated Apr. 19, 2017, 2 pages.

*Primary Examiner* — Qutbuddin Ghulamali
(74) *Attorney, Agent, or Firm* — Nixon & Vanderhye P.C.

(57) ABSTRACT

The invention relates to a method of estimating an electrical length of a line, which is the signal loss measured at a predetermined frequency such as 1 MHz, compensated for impairments on the line. Firstly, the H log(f) data representing the attenuation plotted against frequency is gathered for the line. Secondly, data transformation is performed on the H log(f) data, such as by dividing by the square root of frequency. This compensates for changes in the loss as a function of frequency, allowing values of the loss from a broader range of frequencies to be used. Thirdly, data spike removal is performed on the transformed data, removing spikes that can arise from a number of factors such as excessive noise. The resulting data is then used to estimate a value for compensated k10.

14 Claims, 9 Drawing Sheets

(56) References Cited

U.S. PATENT DOCUMENTS

| | | | | |
|---|---|---|---|---|
| 2007/0014393 A1* | 1/2007 | Jensen | ................ | H04M 3/305 |
| | | | | 379/30 |
| 2008/0317161 A1* | 12/2008 | Pascal | ................ | H04W 52/246 |
| | | | | 375/295 |
| 2012/0250744 A1* | 10/2012 | Humphrey | ........... | H04M 11/062 |
| | | | | 375/222 |

* cited by examiner

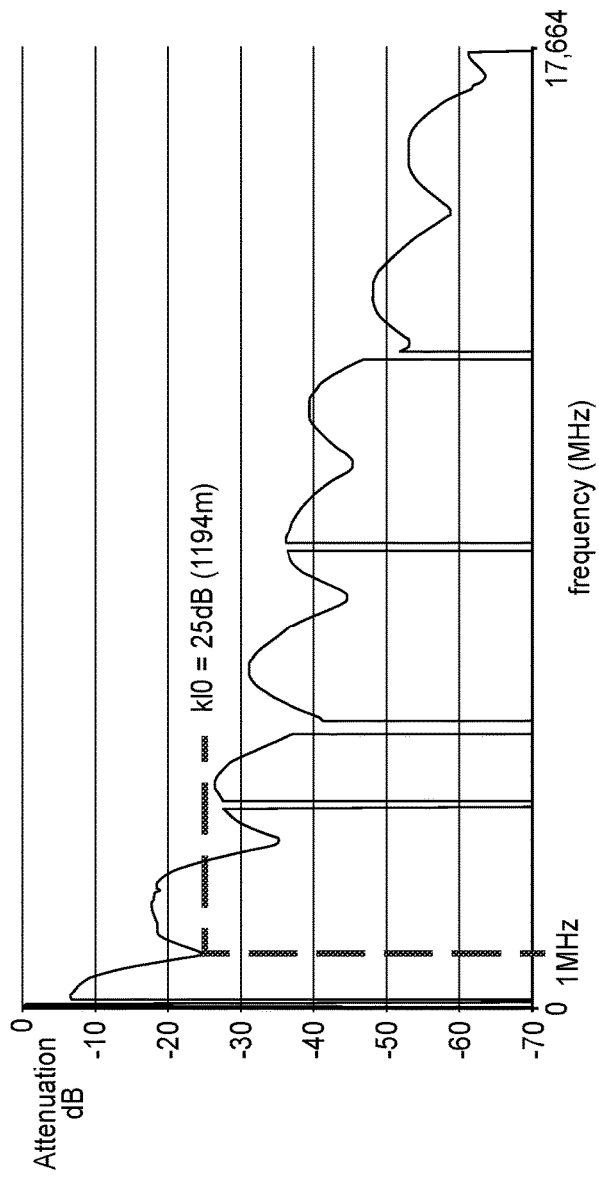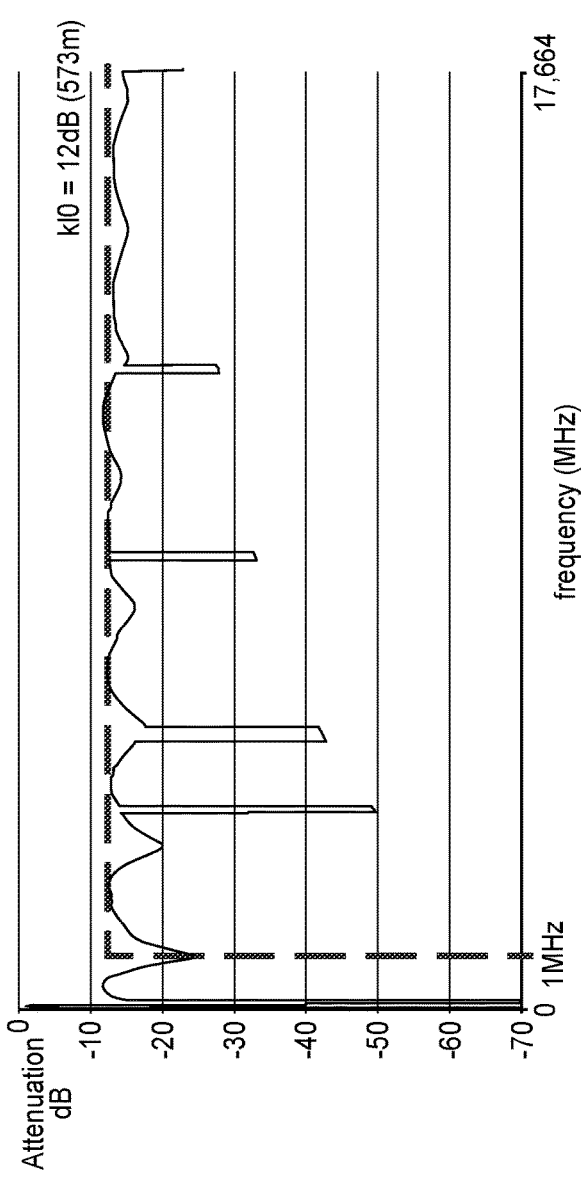

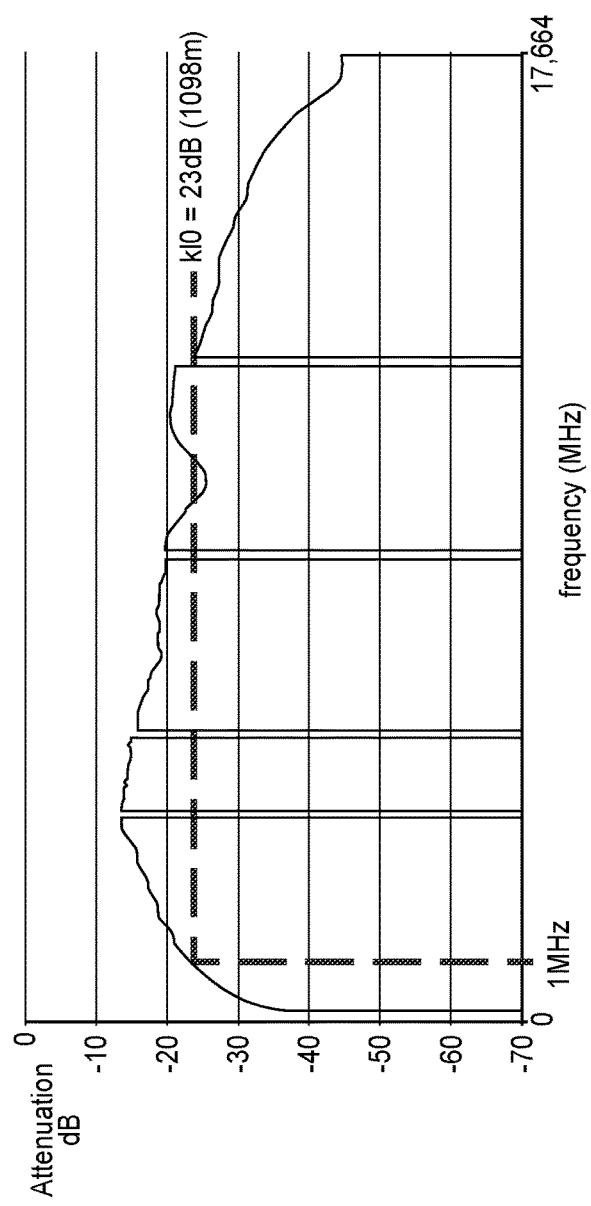
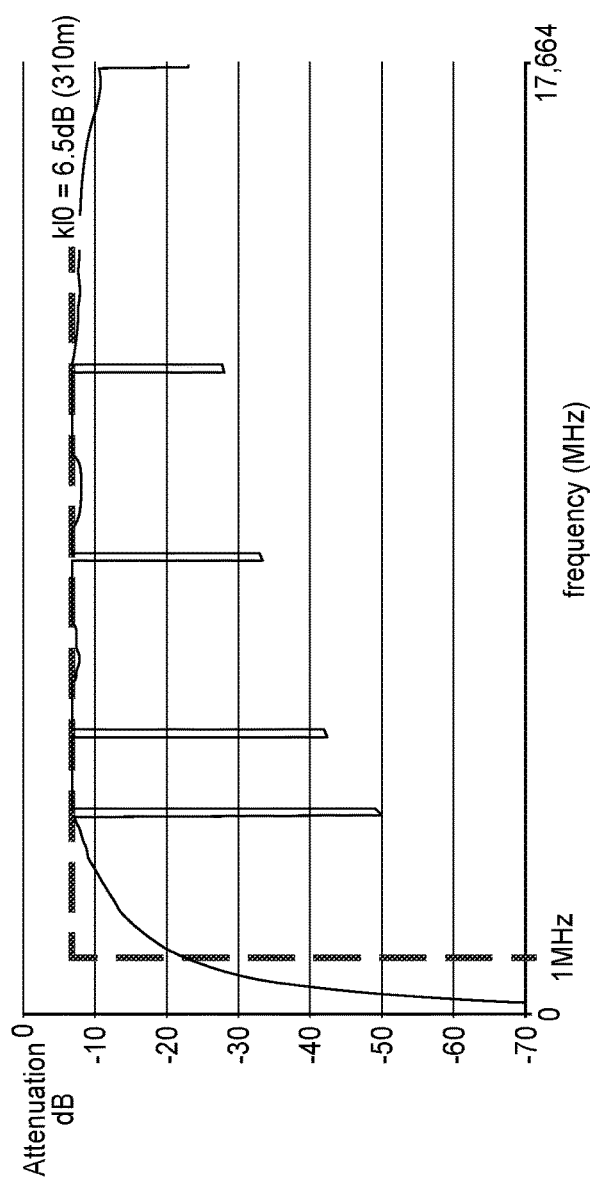

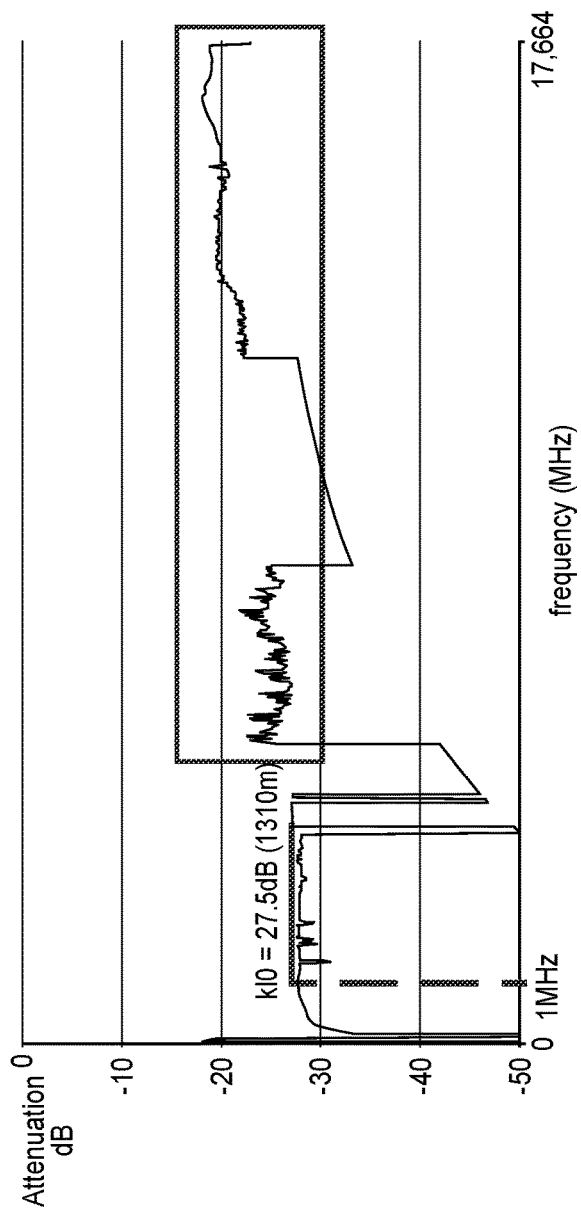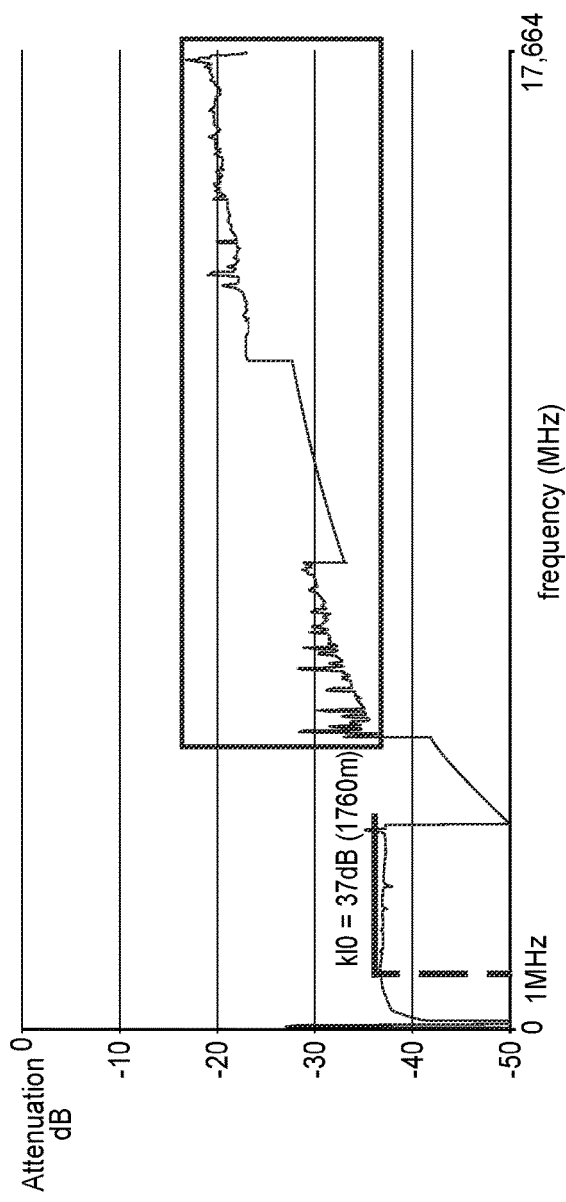

ESTIMATING THE ELECTRICAL LINE LENGTH OF A DIGITAL SUBSCRIBER LINE

This application is the U.S. national phase of International Application No. PCT/EP2017/055851 filed 13 Mar. 2017, which designated the U.S. and claims priority to EP Patent Application No. 16162972.0 filed 30 Mar. 2016, the entire contents of each of which are hereby incorporated by reference.

FIELD OF THE INVENTION

This invention relates a method and apparatus for estimating the electrical length of a digital subscriber line.

BACKGROUND

Digital subscriber line (DSL) technology, often referred to as "broadband", is a family of services that provides high speed digital data transmission over the metallic twisted copper pairs that form part of a local telephone network. A DSL line is commonly used to provide a customer's home with a network connection, typically to the Internet via an ISP.

The attainable synchronisation or data rate that can be supported by a DSL line is related to the length of the line, with shorter lines supporting higher rates. The physical length here is for the metallic path and measured from the network side DSL modem, usually found in the exchange for an ADSL line or in a roadside cabinet in a VDSL line, to the customer premises. The physical length of a line is thus a useful measure for estimating the attainable sync rate for a line. Furthermore, the length can be used for benchmarking the performance of a line, by allowing comparisons to be made between similar length lines.

As the physical length of a DSL line is not easily measureable, the attenuation on a line can be used instead, as the attenuation experienced by a signal transmitted over a line is related to the line length, with attenuation increasing with line length. This leads to the concept of the electrical length of a line, referred to as kl0 in the ITU standard for VDSL2 G.993.2. kl0 is measured as the attenuation or loss of a signal transmitted at 1 MHz, and thus can be used to compare different lines. However, the electrical line length kl0 is affected by physical impairments, noise impairments, or measurement noise on the line, resulting in the measured kl0 being higher than the value for kl0 if impairments were not present. Therefore, the actual, or impaired, kl0 measurement is not truly reflective of the line length.

SUMMARY OF THE INVENTION

It is the aim of embodiments of the present invention to provide a method of estimating the electrical length of a line that is compensated for impairments.

According to one aspect of the present invention, there is provided a method of estimating the electrical length of a digital subscriber line, wherein the electrical length is the attenuation at a predetermined frequency, comprising:

gathering attenuation data associated with the digital subscriber line, wherein the attenuation data comprises attenuation values measured as a function of frequency for the digital subscriber line;

generating transformed data by applying a predetermined transform function to the attenuation data, where the transform function is a function of the frequency at which the respective attenuation values are measured;

removing data spikes from the transformed data by comparing attenuation values in the transformed data with neighbouring values, and smoothing attenuation values that are not within a predetermined range of the neighbouring attenuation values;

generating truncated data comprising transformed data following data spike removal at frequencies less than a noise floor frequency, wherein the noise floor frequency is equal to the frequency at which the attenuation data first falls below a predetermined attenuation; and estimating a compensated electrical line length, wherein the compensated electrical line length is taken as the representative attenuation value from the truncated data at or above the predetermined frequency.

The transformed data may be the function of applying an inverse square root of the frequency to the attenuation data.

Smoothing may comprise replacing an attenuation value with an attenuation value dependent on the neighbouring attenuation values. The attenuation value may be replaced by the average of the neighbouring attenuation values. Alternatively, the attenuation value may be replaced by the minimum value from the neighbouring attenuation values.

The attenuation data may be H log(f) data. The predetermined frequency may be 1 MHz.

According to a further aspect of the present invention, there is provided a line estimation module for estimating the electrical length of a digital subscriber line, wherein the electrical length is the attenuation at a predetermined frequency, said module adapted in use to:

gathering attenuation data associated with the digital subscriber line, wherein the attenuation data comprises attenuation values measured as a function of frequency for the digital subscriber line;

generate transformed data by applying a predetermined transform function to the attenuation data, where the transform function is a function of the frequency at which the respective attenuation values are measured;

remove data spikes from the transformed data by comparing attenuation values in the transformed data with neighbouring values, and smoothing attenuation values that are not within a predetermined range of the neighbouring attenuation values;

generate truncated data comprising transformed data following data spike removal at frequencies less than a noise floor frequency, wherein the noise floor frequency is equal to the frequency at which the attenuation data first falls below a predetermined attenuation; and estimate a compensated electrical line length, wherein the compensated electrical line length is taken as the representative attenuation value from the truncated data at or above the predetermined frequency.

Examples of the invention calculate a value of an electrical line length or "kl0" that has been compensated for physical impairments, noise impairments or measurement noise. Physical impairments include, bad joints and taps on the line like home telephone star wiring. However, this method could be applied to any loss metric derived from a wide band loss measurement, e.g. loss at 10 MHz or weighted average loss across a DSL transmission band.

The value of compensated kl0, or $kl0_{comp}$, reflects the kl0 loss estimate figure that would be achieved if impairments were not present, and therefore provides a more accurate reflection of the physical length of the metallic path between the modems responsible for providing broadband service.

Once calculated, the $kl0_{comp}$ value can be used to benchmark DSL line rates and performance of a line against what would typically be expected for a working line of equivalent length. It can also be used to help detect a number of different types of fault condition that may be present so that appropriate action can be taken, again by comparison to characteristics of lines with a similar compensated electrical line length $kl0_{comp}$.

BRIEF DESCRIPTION OF THE DRAWINGS

For a better understanding of the present invention reference will now be made by way of example only to the accompanying drawings, in which:

FIG. 7a is a graph of H log(f) for a line exhibiting a bridge tap impairment;

FIG. 7b is a graph of H log(f) for a line exhibiting a bridge tap impairment after processing in an example of the invention;

FIG. 8a is a graph of H log(f) for a line exhibiting a high resistance joint impairment;

FIG. 8b is a graph of H log(f) for a line exhibiting a high resistance joint impairment after processing in an example of the invention;

FIG. 9a is a graph of transformed H log(f) data for a longer line in an example of the invention;

FIG. 9b is a further graph of transformed H log(f) data for a longer line in an example of the invention.

DESCRIPTION OF PREFERRED EMBODIMENTS

The present invention is described herein with reference to particular examples. The invention is not, however, limited to such examples.

Examples of the present invention present a method of estimating an electrical length of a line, which is the signal loss measured at 1 MHz, compensated for impairments on the line. Firstly, the H log(f) data for the line is gathered, representing the attenuation plotted against frequency. Secondly, data transformation is performed on the H log(f) data, preferably by dividing by the square root of frequency. This compensates for changes in the attenuation as a function of frequency, allowing values of the attenuation from a broader range of frequencies to be used. Thirdly, data spike removal is performed on the transformed data, removing spikes that can arise from a number of factors such as excessive noise. Fourthly, noise floor truncation can be optionally performed, whereby a threshold frequency is used to limit which parts of the transformed data following data spike removal are to be used for estimating kl0. This prevents attenuation data from higher frequencies being used to estimate kl0, when excessive line length may have resulted in unreliable H log(f) values due to the presence of a measurement noise floor. The resulting data after noise floor truncation (if performed) or after data spike removal is then used to estimate a value for compensated kl0.

Figure 1:
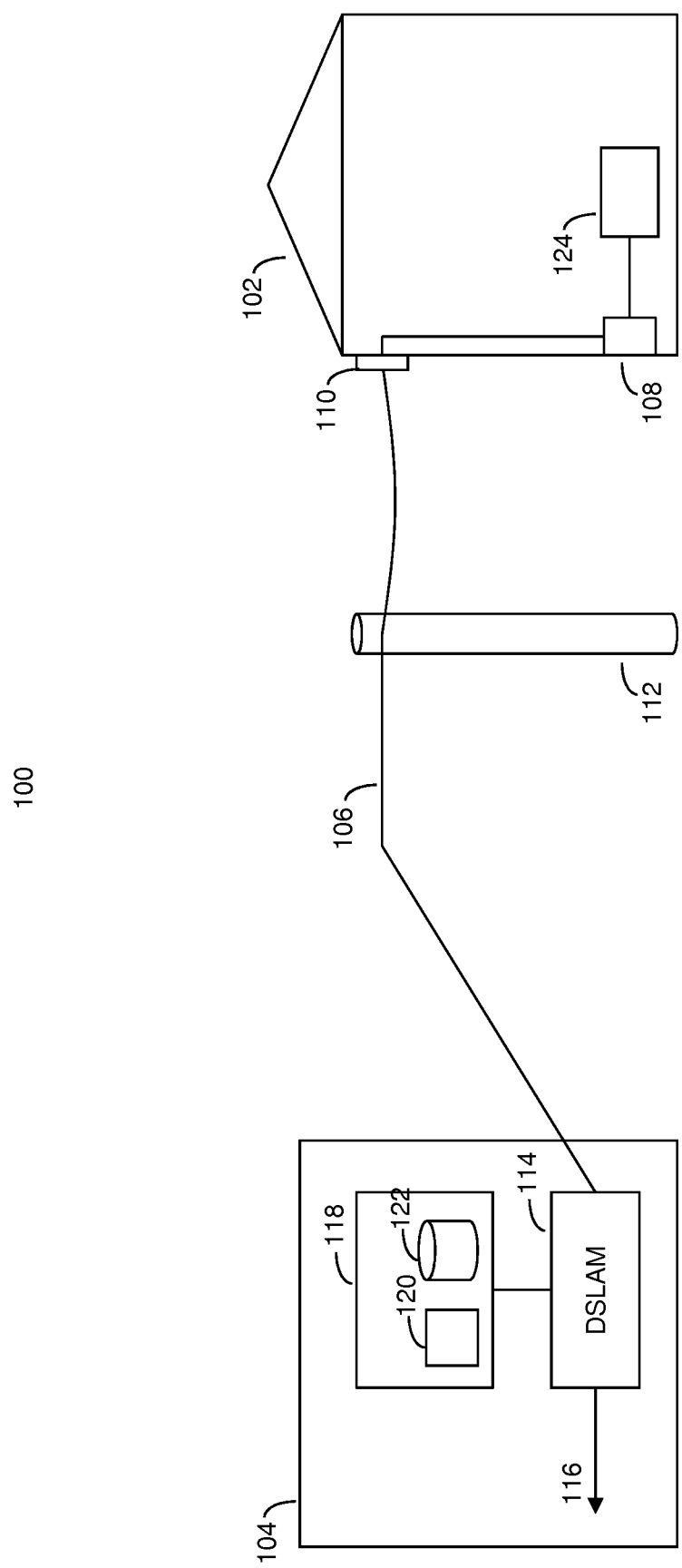
FIG. 1 is a system diagram showing a DSLAM in a telephone exchange/cabinet and a digital subscriber line running to a customer premises.

FIG. 1 illustrates a telecommunications network 100 including a customer's premises 102. The customer's premises 102 is connected to a telephone exchange 104 via a telephone line 106. The telephone line is a twisted copper or aluminium pair of wires. Specifically, a network termination equipment NTE 108 is at the customer premises 102 end of the line 106. The NTE 108 is often referred to as a line box or master socket, and is the demarcation point between the telephone network and the customer wiring in the customer premises 102. The line 106 runs from the NTE 108 to a junction box 110, and then onto a distribution point DP 112. In this example, the DP 112 is a junction on a telephone pole. The line 106 then continues onto the exchange 104 where it terminates a digital subscriber line access multiplexer, DSLAM, 114. Within the customer premises 102, the NTE 108 is connected to customer premises equipment CPE 124, typically a router or access point such as BT's Home Hub.

The DSLAM is a network element that provides digital subscriber line (DSL) services to connected lines and associated customer premises. The line 106 is thus also referred to as digital subscriber line, or DSL line. At the exchange is also a line estimation module 118, connected to the DSLAM 114. The line estimation module 118 comprises a processor 120, and a data store 122, such as hard disk array or similar. The estimation module 118 gathers various measurements made by the DSLAM 114, stores them in the data store 122, and the processor 120 uses the stored measurements to estimate line lengths compensated for impairments.

The DSLAM 114 also has onward connections 116 to data provisioning networks. A skilled person will also appreciate that there are other elements in the exchange 104, such as elements that provide standard PSTN services to connected lines. However, these have been omitted for simplicity.

Whilst the present example shows a DSLAM residing in the exchange 104, the invention is also applicable to configurations where the DSLAM is situated elsewhere. For example, in a fibre to the cabinet (FTTC) arrangement, the DSLAM 114 is located in a roadside cabinet, which is typically located nearer the customer premises than the exchange, which is a more common setup for VDSL (very high bit rate DSL) lines. In an alternative network arrangement, DSLAM like functionality can be provided by an MSAN (multi services access node), which also provides other capabilities such as voice.

The DSLAM 114 measure various parameters associated with the line 106. The main parameter used in examples of this invention is H log(f), which is the log of the attenuation or line loss by frequency. H log(f) is derived by taking the logarithm of H(f), the attenuation measurements, made by the modem in the DSLAM 114 and also in the CPE 128 during initialisation (or a loop diagnostic mode) of the line 106. In the example of a VDSL2 line, data is carried over discrete frequencies or bins, separated into bands that are allocated for upstream and downstream data transmission. Thus H log(f) is taken at discrete frequencies as well, though when plotted on a graph the data points are usually connected together.

Figure 2:
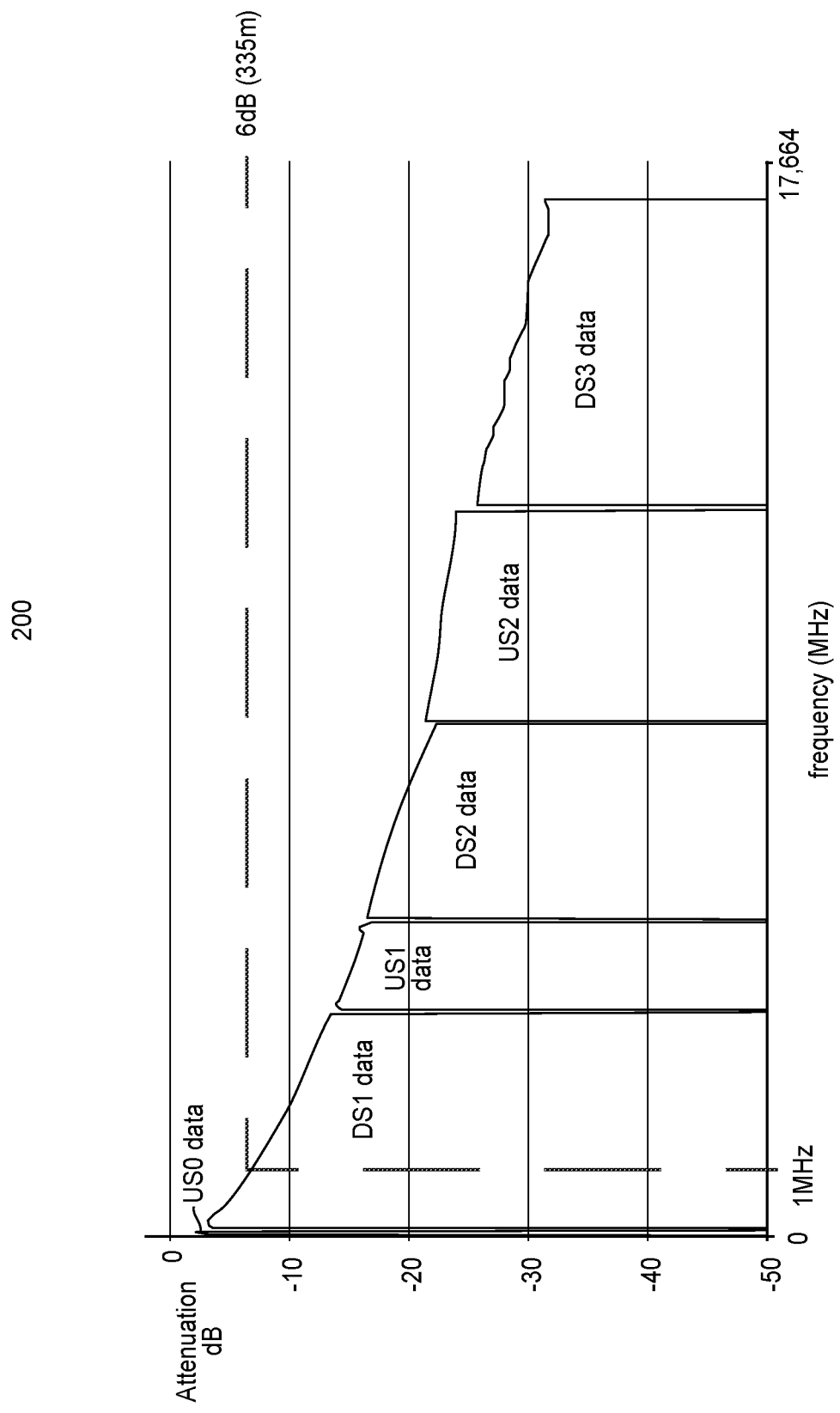
FIG. 2 is a graph showing H log(f), the attenuation measured as a function of frequency, for a digital subscriber line.

FIG. 2 shows a graph 200 of H log(f) for an example line, with attenuation in dB on the y-axis and frequency in MHz on the x-axis. The individual bands have also been marked on the graph: DS1 data for downstream band 1, US1 data for upstream band 1, DS2 data for downstream band 2, US2 data for upstream band 2, and DS3 data for downstream band 3. The H log(f) graph 200 here is illustrative of a line that is not exhibiting any significant line impairments. As such, the electrical line length kl0, the attenuation at 1 MHz, can be read directly from the graph. It is −6 dB in this example, which is often referred to as 6 dB loss, as negative dB indicates a loss. The method below describes an improvement with additional steps for determining an electrical line length kl0 that has been compensated for line impairments.

Figure 3:
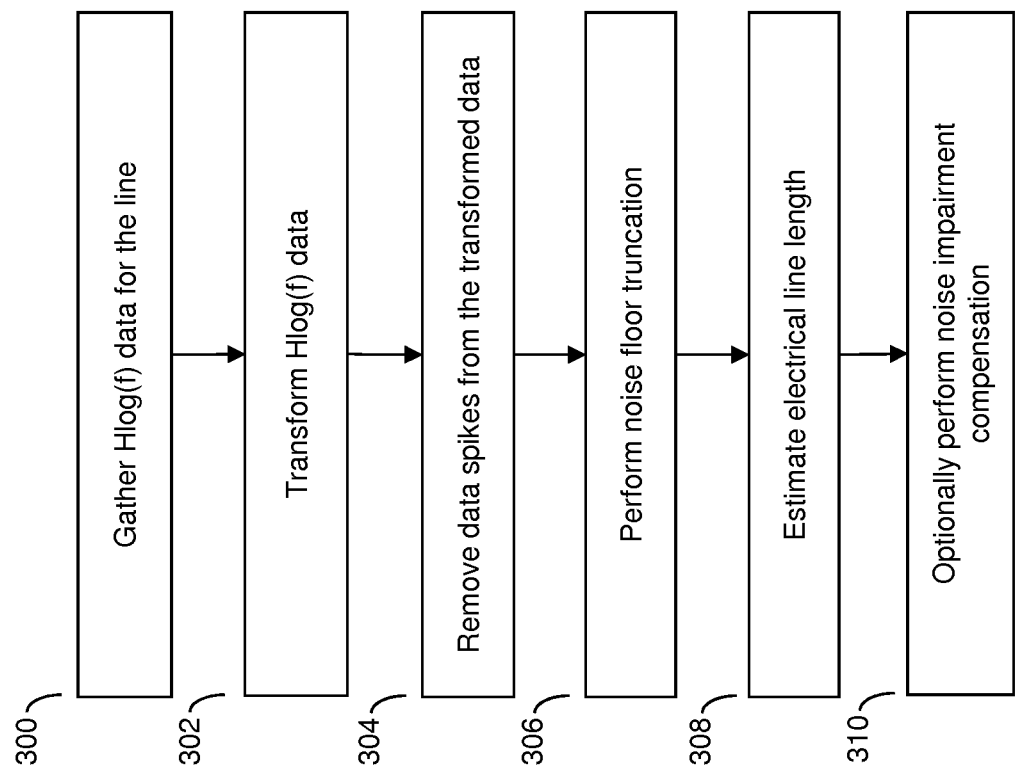
FIG. 3 is a flow chart summarising the steps of an example of the invention.

FIG. 3 is a flow chart summarising the steps of an example of the invention as performed by the estimation module 118.

In step 300, H log(f) data measured by the DSLAM 114 for the line 106 as described above, is gathered by the estimation module 118 and stored in the data store 122. Historical as well as the most recent H log(f) data can be stored and used. In this example, the most recent H log(f) data is used.

In step 302, H log(f) is transformed using a transform function. The transformation looks to normalise the data, allowing attenuation values from a broader range of frequencies (in particular the higher frequencies) to be used. Visually, the effect of the transformation for an ideal line (one without impairments) is to convert the curved plot of H log(f) in graph 200 into a straight line plot. This can be done by selecting a frequency model that best represents H log(f) for an ideal line, and using that function to transform H log(f). It has been found that such a frequency model can be approximated to a polynomial function. In this example, the function used is an inverse square root function of f, and thus the transform function applied to H log(f) is the inverse square root of f, where f is the frequency at which H log(f) is measured. Transformed H log(f) data can be presented as:

$$\text{transformed\_}H\log(f) = H\log(f)/\text{sqrt}(f) \quad (1)$$

In equation 1 above, the frequency is measured in MHz.

Figure 4:
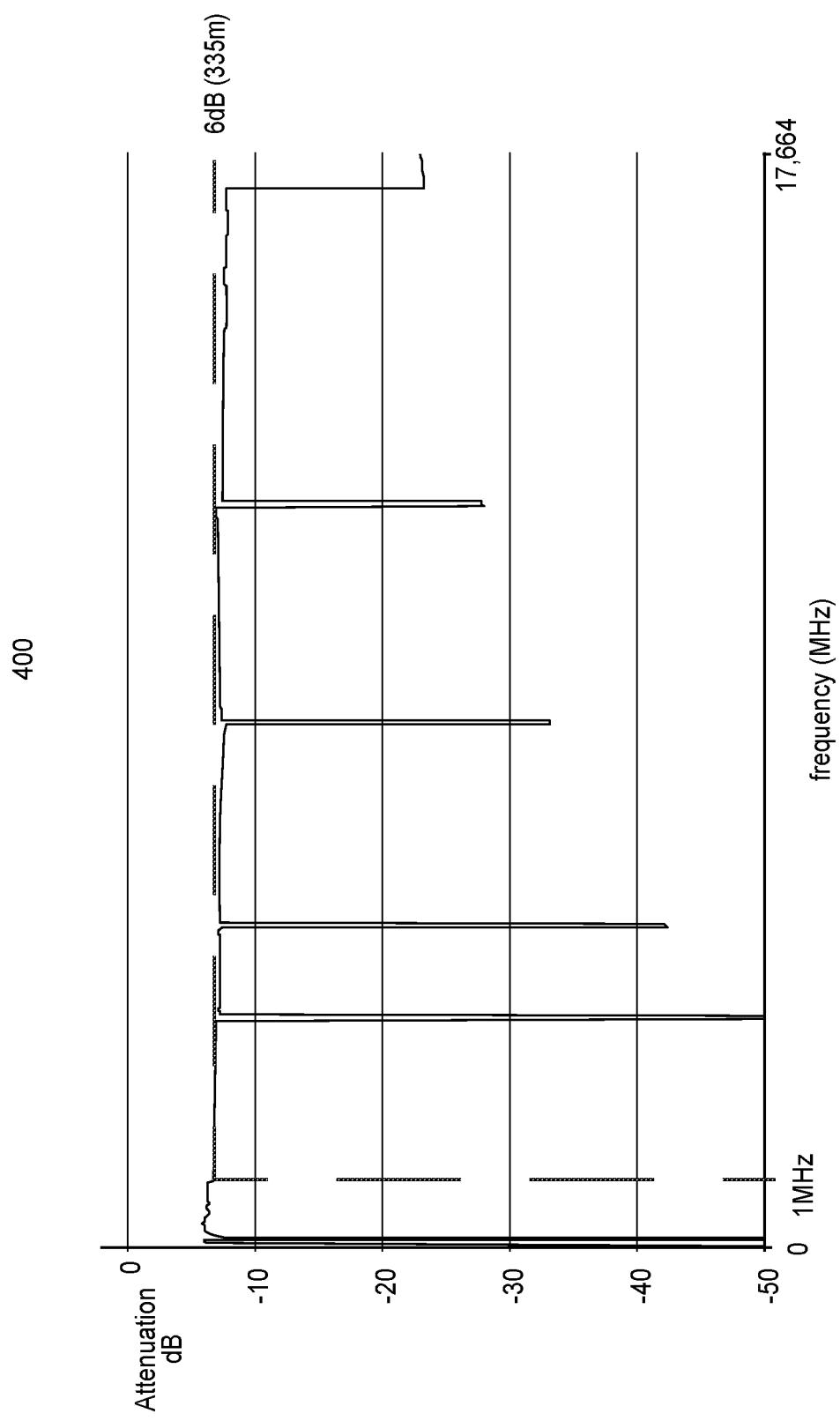
FIG. 4 is a graph showing transformed H log(f)

FIG. 4 shows a graph 400 of transformed H log(f). As can be seen, transformed H log(f) is approximately a straight line plot.

Next in step 304, data spikes are removed from the transformed data. The aim is to remove any spikes in the transformed data, which are caused by excessive noise levels during measurement of H log(f). The method involves replacing values in the truncated H log(f) with a respective value based on neighbouring data points. If data spikes are not removed, the final estimated value for kl0 might be erroneously low.

One way of performing spike removal is set out using the pseudo code below:

```
// look through all of the transformed hlog data
For bin = 1 to L {
  // calculate minimum value
  // start by setting an initial value for the minimum
  hlog_transformed_min = hlog_transformed(bin)
  // next look at all of the bins within spikeRemovalRange of the
  current bin
  for (mbin = (bin – spikeRemovalRange) to (bin +
  spikeRemovalRange) ) {
    // check that mbin is within the range of bins available in
    hlog_transformed array
    // and that the value at mbin is less than the current minimum value
    // and, if the conditions are true, set the new minimum value
    if ((mbin between 1 and L) and ( hlog_transformed(mbin) <
    hlog_transformed_min))
      then hlog_transformed_min = hlog_transformed(mbin)
  }
  // use the minimum value as the data spike removed value
  hlog_transformed_and_spikes_removed(bin) = hlog_transformed_min
}
```

The approach set out above uses a windowed approach, with the variable "spikeRemovalRange" setting out a window size over which a data point or "bin" is to be considered. In essence, if there are values within this window that are less than the value for the bin being processed, the bin will take the value if the lowest value in the window around the bin.

Figure 5:
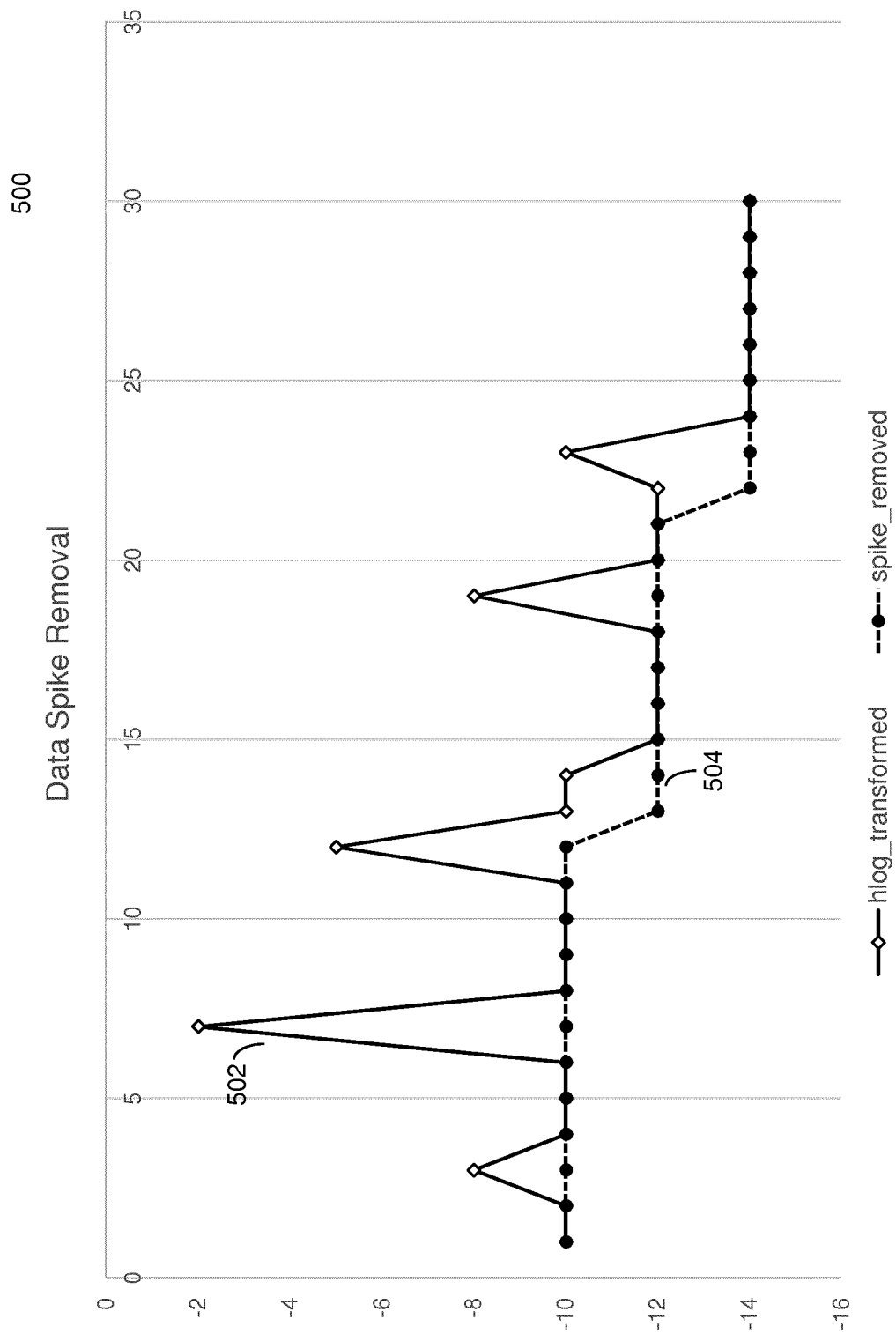
FIG. 5 is a graph showing plots before and after data spike removal.

FIG. 5 shows a graph with some example data points for transformed H log(f) before spike removal 500 and after spike removal 502. It can be seen that spike removal has the effect of smoothing the transformed H log data by replacing any data points that are higher than neighbouring data points with a lower value taken from one of the neighbours.

It should be noted that data falling within the gaps between the various frequency bands are ignored, such as exists between the downstream DS1 band and the upstream US1 band.

In alternative approaches, spike removal can be achieved by replacing data points that are higher than neighbouring points with a value taken as the average of neighbouring points. The neighbours in both these examples are points that lie within a predetermined window centred around the data point being analysed.

In step 306, noise floor truncation is performed on the transformed H log(f) data following spike removal. The purpose of noise floor truncation is to prevent higher frequency values of the transformed (and smoothed) data being used in the later estimation step, as the values at higher frequencies may be unreliable due to the presence of a measurement noise floor, in effect background noise.

The step comprises setting a predetermined noise floor value, based on analysis of a large population of lines, and will vary depending on the underlying noise conditions associated with particular equipment for example. The value used in testing for VDSL2 lines is −70 dB.

Figure 6:
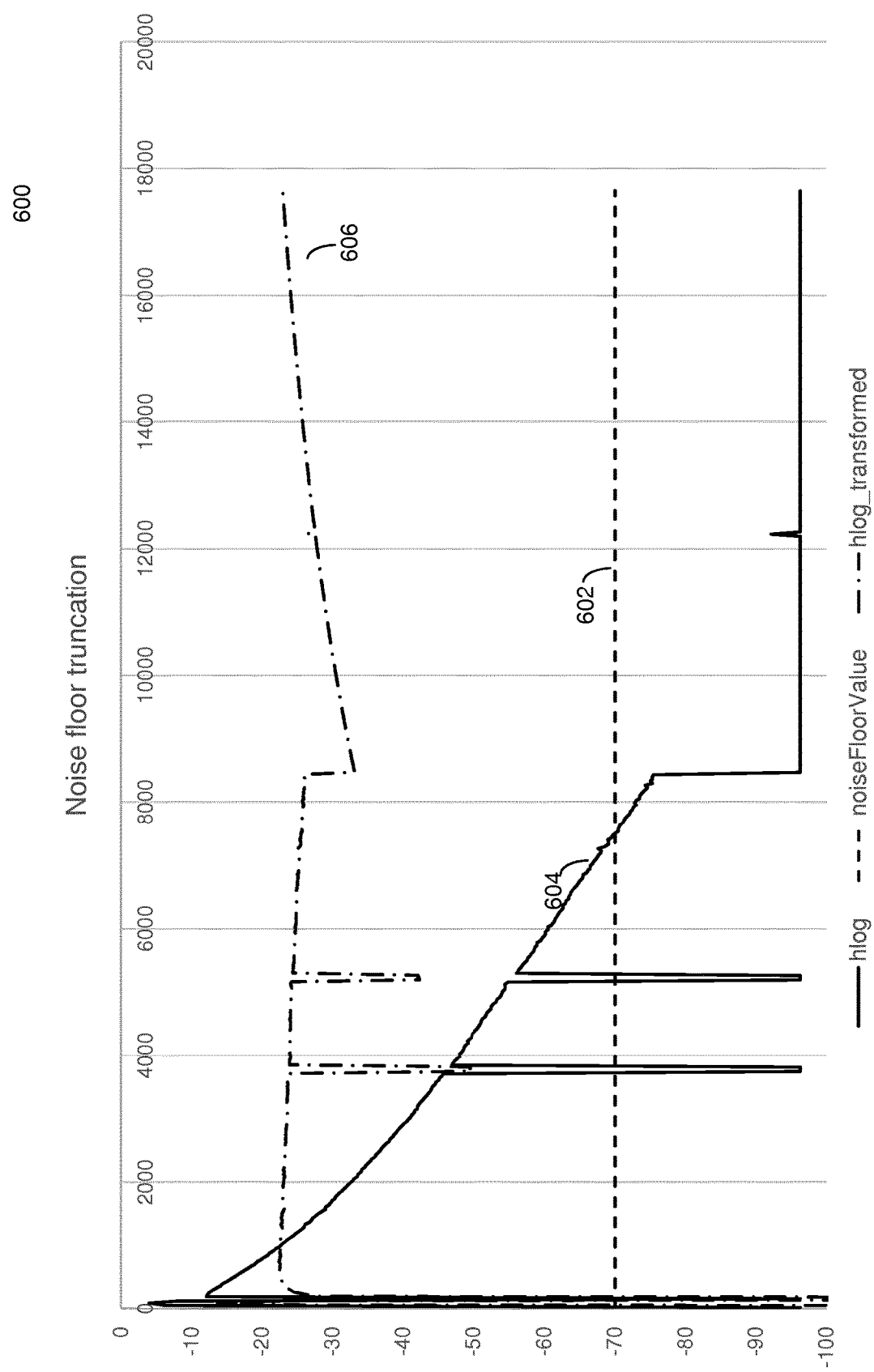
FIG. 6 is a graph illustrating noise floor truncation.

The H log(f) data (from step 300 before transformation) is analysed using the predetermined noise floor value to determine the frequency above which the attenuation falls below the noise floor. FIG. 6 shows a graph 600 of attenuation vs frequency (measured in kHz) that includes the noise floor value of −70 dB plotted 602, together with H log(f) 604 and transformed H log(f) 606. Here it can be seen that the frequency above which H log(f) falls below the noise floor is around 7500 kHz. This frequency is effectively is used as an upper threshold on transformed H log(f) 606, so that data above the threshold (here 7500 kHz) is not used in the subsequent estimation of the electrical line length in step 310.

In step 308, the electrical line length compensated for line impairments kl0 is estimated from the smoothed data resulting from step 306. The above steps are effective at compensated for impairments such as high resistance joints (so called "HR joints"), disconnection faults and bridge taps.

FIG. 7a shows the H log(f) data, attenuation vs frequency, for a line with a bridge tap impairment before any processing (e.g. from step 300). The H log(f) plot shows dips in the attenuation dropping over time, and thus reading the attenuation at 1 MHz for kl0 would be much higher than would otherwise be the case. Here kl0 is 25 dB. However, after processing according to the method described above, the attenuation plotted against frequency is shown in FIG. 7b and is a much smoother and flatter plot, allowing more of the data to be used in estimating kl0. Here, the approach is to equate kl0 to the maximum value at or above 1 MHz. Thus, in the example of FIG. 7b, which starts with the same data as FIG. 7a, but includes the additional processing described above, the value of kl0 is 12 dB. This value of kl0 represents the true electrical line length after correcting for impairments.

In another example, FIG. 8a shows the H log(f) data for a line with a high resistance joint before any processing (e.g.

from step 300). The H log(f) plot shows lower frequency signals being attenuated more than normal. Again, the result is that reading the attenuation at 1 MHz for kl0 would be much higher than would otherwise be the case. Here kl0 is 23 dB. However, after processing according to the method described above, the attenuation plotted against frequency is shown in FIG. 8b and is a much smoother and flatter plot. Again, the approach here is to equate kl0 to the maximum value at or above 1 MHz, which here equals 6.5 dB. This compensated kl0 value represents the electrical line length without line impairments.

The method for step 308 describe here takes the maximum value of attenuation at or above 1 MHz using the processed data from step 306. However, other approaches can be used that reflect the overall attenuation at or above 1 MHz, such as taking the attenuation of the $90^{th}$ percentile at and above 1 MHz. Or taking the average of the highest 10% of attenuation values at and above 1 MHz. A skilled person will appreciate that other aggregation methods can be used to achieve a similar result.

Whilst the result of step 308 is to estimate a value for the electrical line length compensated for impairments, an additional step 310 can be optionally performed.

Step 310 aims to correct the data from step 306 for noise impairment. Noise impairment can arise from both noise and measurement inaccuracy encountered when measuring the H log(f) at higher frequencies when the line is long. From observations of VDSL2 lines, this has been seen to occur when the length is near or above around a mile long.

Typically, the effects of the inaccuracy can be seen in H log/sqrt(f) plots after step 302, where the attenuation values at lower frequencies follow a line parallel with the x-axis whereas values at higher frequencies are much higher than one would expect with an overall shape that imitates the quiet-line noise (QLN) data measured for the line. This is illustrated in FIGS. 9a and 9b, which show the transformed H log(f) plots with the undesirable higher frequencies marked by the right-hand boxes.

The method effectively sets upper thresholds on the frequencies that are used in step 308 when estimating kl0. Whilst some truncation of the data is already done in step 306, the frequency range is limited further by step 310.

Thus, when step 308 is first performed, a subset of the data from step 306 between 1 MHz and the end of a first frequency band f1 is used to estimate kl0. If the estimate e1 for kl0 is less than or equal to a threshold t1, a revised estimate is then made by repeating the estimation using a larger subset of data taken up to a higher frequency f2.

In theory, the above process of extending the set of data to higher and higher frequencies can be repeated many more times by defining further frequency and threshold pairs so that more of the data is used when lines are shorter. In practice, the use of the three frequencies, each of which mark the upper frequency end of the downstream data channel bands has been shown to give very good results for the current population of UK VDSL2 lines. The resulting threshold values for t1=−25 dB and t2=−16 dB being used based upon studies of data captured from the population of lines.

The frequency thresholds are set out in the respective band plan in use for the line being processed. For example in the UK, VDSL band plan 998 is often used, and defines the frequency ranges for each of the channels (e.g. downstream DS1) that are used.

The noise impairment compensation method outlined above gives good results even if data is missing as illustrated by the two cases shown in FIGS. 9a and 9b where it has not been possible to capture data for either the US1 or the US2 data channels.

Exemplary embodiments of the invention are realised, at least in part, by executable computer program code which may be embodied in an application program data. When such computer program code is loaded into the memory of the processor 120 in the estimation module 118, it provides a computer program code structure which is capable of performing at least part of the methods in accordance with the above described exemplary embodiments of the invention.

A person skilled in the art will appreciate that the computer program structure referred to can correspond to the flow chart shown in FIG. 3, where each step of the flow chart can correspond to at least one line of computer program code and that such, in combination with the processor 120 in the estimation module 118, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of estimating the electrical length of a digital subscriber line, wherein the electrical length is the attenuation at a predetermined frequency, comprising:
   i) gathering attenuation data associated with the digital subscriber line, wherein the attenuation data comprises attenuation values measured as a function of frequency for the digital subscriber line;
   ii) generating transformed data by applying a predetermined transform function to the attenuation data, where the transform function is a function of the frequency at which the respective attenuation values are measured;
   iii) removing data spikes from the transformed data by comparing attenuation values in the transformed data with neighbouring values, and smoothing attenuation values that are not within a predetermined range of the neighbouring attenuation values;
   iv) generating truncated data comprising transformed data following data spike removal at frequencies less than a noise floor frequency, wherein the noise floor frequency is equal to the frequency at which the attenuation data first falls below a predetermined attenuation; and
   v) estimating a compensated electrical line length, wherein the compensated electrical line length is taken as the representative attenuation value from the truncated data at or above the predetermined frequency.

2. The method according to claim 1, wherein the transformed data is the function of applying an inverse square root of the frequency to the attenuation data.

3. The method according to claim 1, wherein the smoothing comprises replacing an attenuation value with an attenuation value dependent on the neighbouring attenuation values.

4. The method according to claim 3, wherein the attenuation value is replaced by an average of the neighbouring attenuation values.

5. The method according to claim 3, wherein the attenuation value is replaced by a minimum value from the neighbouring attenuation values.

6. The method according to claim 1, wherein the attenuation data is H log(f) data.

7. The method according to claim 1, wherein the predetermined frequency is 1 MHz.

8. A line estimation module for estimating the electrical length of a digital subscriber line, wherein the electrical length is the attenuation at a predetermined frequency, said module adapted in use to:
   gather attenuation data associated with the digital subscriber line, wherein the attenuation data comprises attenuation values measured as a function of frequency for the digital subscriber line;
   generate transformed data by applying a predetermined transform function to the attenuation data, where the transform function is a function of the frequency at which the respective attenuation values are measured;
   remove data spikes from the transformed data by comparing attenuation values in the transformed data with neighbouring values, and smoothing attenuation values that are not within a predetermined range of the neighbouring attenuation values;
   generate truncated data comprising transformed data following data spike removal at frequencies less than a noise floor frequency, wherein the noise floor frequency is equal to the frequency at which the attenuation data first falls below a predetermined attenuation; and
   estimate a compensated electrical line length, wherein the compensated electrical line length is taken as the representative attenuation value from the truncated data at or above the predetermined frequency.

9. The module according to claim 8, wherein the transformed data is the function of applying an inverse square root of the frequency to the attenuation data.

10. The module according to claim 8, wherein the smoothing comprises replacing an attenuation value with an attenuation value dependent on the neighbouring attenuation values.

11. The module according to claim 10, wherein the attenuation value is replaced by an average of the neighbouring attenuation values.

12. The module according to claim 10, wherein the attenuation value is replaced by a minimum value from the neighbouring attenuation values.

13. The module according to claim 8, wherein the attenuation data is H log(f) data.

14. The module according to claim 8, wherein the predetermined frequency is 1 MHz.

* * * * *